(12) United States Patent
Grossman et al.

(10) Patent No.: US 7,814,438 B2
(45) Date of Patent: *Oct. 12, 2010

(54) CONTACT PAGE

(75) Inventors: Joel K. Grossman, Seattle, WA (US); Cornelis K. van Dok, Bellevue, WA (US); Jonathan D. Perlow, Seattle, WA (US); Vivien Park, Seattle, WA (US); Sean O. Blagsvedt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

This patent is subject to a terminal disclaimer.

(21) Appl. No.: 11/760,392

(22) Filed: Jun. 8, 2007

(65) Prior Publication Data

US 2007/0240081 A1 Oct. 11, 2007

Related U.S. Application Data

(63) Continuation of application No. 10/324,251, filed on Dec. 19, 2002, now Pat. No. 7,240,298.

(51) Int. Cl.
G06F 3/048 (2006.01)
G06F 3/00 (2006.01)
(52) U.S. Cl. ...................... 715/854; 715/752
(58) Field of Classification Search ............ 715/752, 715/854
See application file for complete search history.

(56) References Cited

U.S. PATENT DOCUMENTS

| | | | |
|---|---|---|---|
| 5,214,756 A | 5/1993 | Franklin | |
| 5,640,565 A | 6/1997 | Dickinson | |
| 5,659,788 A | 8/1997 | Someya | |
| 5,737,726 A | 4/1998 | Cameron | |
| 5,767,897 A | 6/1998 | Howell | |
| 5,870,744 A | 2/1999 | Sprague | |
| 5,873,108 A | 2/1999 | Goyal | |
| 5,896,321 A | 4/1999 | Miller | |

(Continued)

FOREIGN PATENT DOCUMENTS

JP  9-046335  2/1997

(Continued)

OTHER PUBLICATIONS

Mohamed; "Marketcircle a recipient of the 2002 Apple Design Awards"; May 15, 2002; Marketcircle.

(Continued)

*Primary Examiner*—William L Bashore
*Assistant Examiner*—David Phantana-angkool
(74) *Attorney, Agent, or Firm*—Workman Nydegger

(57) ABSTRACT

A computing system and a user interface display requested data corresponding with a contact at a display device. The requested data includes contact information, communication histories, and files associated with the contact. The requested data is obtained from one or more contact information directories located locally and/or remotely from the computing system. The user interface also displays contact-centric tasks that may be engaged in between the user and the contact based upon the capabilities of the corresponding computing systems or that can be performed on a contact. Some of the contact information can be edited with an edit mode of the user interface. The contact may be a person, group, organization, or household.

23 Claims, 7 Drawing Sheets

U.S. PATENT DOCUMENTS

| | | | |
|---|---|---|---|
| 5,913,032 | A | 6/1999 | Schwartz |
| 5,923,848 | A | 7/1999 | Goodhand |
| 5,950,193 | A | 9/1999 | Kulkarni |
| 5,959,629 | A | 9/1999 | Masui |
| 5,999,208 | A | 12/1999 | McNerney |
| 6,008,799 | A | 12/1999 | Van Kleeck |
| 6,014,135 | A | 1/2000 | Fernandes |
| 6,026,396 | A | 2/2000 | Hall |
| 6,065,012 | A | 5/2000 | Balsara |
| 6,208,339 | B1 | 3/2001 | Atlas |
| 6,209,005 | B1 | 3/2001 | Harker |
| 6,212,534 | B1 | 4/2001 | Lo |
| 6,216,122 | B1 | 4/2001 | Elson |
| 6,247,043 | B1 | 6/2001 | Bates |
| 6,269,369 | B1 | 7/2001 | Robertson |
| 6,339,826 | B2 | 1/2002 | Hayes |
| 6,411,961 | B1 | 6/2002 | Chen |
| 6,434,564 | B2 | 8/2002 | Ebert |
| 6,460,074 | B1 | 10/2002 | Fishkin |
| 6,539,379 | B1 | 3/2003 | Vora |
| 6,557,004 | B1 | 4/2003 | Ben-Shachar |
| 6,564,213 | B1 | 5/2003 | Ortega |
| 6,571,235 | B1 | 5/2003 | Marpe |
| 6,581,059 | B1 | 6/2003 | Barrett |
| 6,581,062 | B1 | 6/2003 | Draper |
| 6,609,108 | B1 | 8/2003 | Pulliam |
| 6,643,661 | B2 | 11/2003 | Polizzi |
| 6,661,434 | B1 | 12/2003 | MacPhail |
| 6,668,281 | B1 | 12/2003 | Ayyadurai |
| 6,678,685 | B2 | 1/2004 | McGill ............... 707/10 |
| 6,699,125 | B2 | 3/2004 | Kirmse |
| 6,701,348 | B2 | 3/2004 | Sommerer |
| 6,718,366 | B2 | 4/2004 | Beck et al. |
| 6,753,889 | B1 | 6/2004 | Najmi |
| 6,781,608 | B1 | 8/2004 | Crawford |
| 6,791,583 | B2 | 9/2004 | Tang |
| 6,820,075 | B2 | 11/2004 | Shanahan |
| 6,820,204 | B1 | 11/2004 | Desai |
| 6,828,988 | B2 | 12/2004 | Hudson |
| 6,829,607 | B1 | 12/2004 | Tafoya |
| 6,832,263 | B2 | 12/2004 | Polizzi |
| 6,839,680 | B1 | 1/2005 | Liu |
| 6,845,370 | B2 | 1/2005 | Burkey |
| 6,859,823 | B1 | 2/2005 | Nishihara |
| 6,870,921 | B1 | 3/2005 | Elsey |
| 6,871,140 | B1 | 3/2005 | Florance |
| 6,883,000 | B1 | 4/2005 | Gropper |
| 6,895,388 | B1 | 5/2005 | Smith |
| 6,907,580 | B2 | 6/2005 | Michelman |
| 6,947,929 | B2 | 9/2005 | Bruce |
| 6,959,340 | B1 | 10/2005 | Najmi |
| 6,983,310 | B2 | 1/2006 | Rouse |
| 6,985,924 | B2 | 1/2006 | Schwartz |
| 6,988,128 | B1 | 1/2006 | Alexander |
| 6,990,495 | B1 | 1/2006 | Grason |
| 6,993,712 | B2 | 1/2006 | Ramachandran |
| 7,007,149 | B2 | 2/2006 | Chung |
| 7,010,572 | B1 | 3/2006 | Benjamin |
| 7,010,599 | B2 | 3/2006 | Shrinivasan ............... 709/225 |
| 7,010,616 | B2 | 3/2006 | Carlson |
| 7,043,471 | B2 | 5/2006 | Cheung |
| 7,068,768 | B2 | 6/2006 | Barnes |
| 7,076,498 | B2 | 7/2006 | Banerjee |
| 7,096,232 | B2 | 8/2006 | Doss |
| 7,113,941 | B2 | 9/2006 | Arend |
| 7,117,271 | B2 | 10/2006 | Haverstock |
| 7,130,853 | B2 | 10/2006 | Roller ............... 707/1 |
| 7,139,774 | B2 | 11/2006 | Dettinger ............... 707/100 |
| 7,143,190 | B2 | 11/2006 | Christensen |
| 7,146,570 | B2 | 12/2006 | Yeh |
| 7,149,731 | B2 | 12/2006 | Dettinger ............... 707/2 |
| 7,159,207 | B2 | 1/2007 | Tang |
| 7,162,474 | B1 | 1/2007 | Harker |
| 7,185,271 | B2 | 2/2007 | Lee |
| 7,185,290 | B2 | 2/2007 | Cadiz |
| 7,191,210 | B2 | 3/2007 | Grossman |
| 7,209,951 | B2 | 4/2007 | Goldberg |
| 7,240,298 | B2 | 7/2007 | Grossman |
| 7,287,053 | B2 | 10/2007 | Bodin |
| 7,302,634 | B2 | 11/2007 | Lucovsky |
| 2002/0073207 | A1 | 6/2002 | Widger |
| 2002/0107914 | A1 | 8/2002 | Charisius |
| 2002/0120864 | A1 | 8/2002 | Wu |
| 2002/0143961 | A1 | 10/2002 | Siegel |
| 2002/0186257 | A1 | 12/2002 | Cadiz et al. |
| 2003/0041065 | A1 | 2/2003 | Lucovsky ............... 707/10 |
| 2003/0041076 | A1 | 2/2003 | Lucovsky |
| 2003/0050911 | A1 | 3/2003 | Lucovsky |
| 2003/0069874 | A1 | 4/2003 | Hertzog |
| 2003/0126137 | A1 | 7/2003 | McFadden |
| 2003/0158855 | A1 | 8/2003 | Farnham |
| 2003/0208465 | A1* | 11/2003 | Yurko et al. ............... 707/1 |
| 2003/0210265 | A1 | 11/2003 | Haimberg |
| 2004/0083453 | A1 | 4/2004 | Knight |
| 2004/0093334 | A1 | 5/2004 | Scherer |
| 2004/0103364 | A1 | 5/2004 | Dornback |
| 2004/0107283 | A1 | 6/2004 | Paddon |
| 2004/0117322 | A1 | 6/2004 | Bjorksten |
| 2004/0119732 | A1 | 6/2004 | Grossman |
| 2004/0119758 | A1 | 6/2004 | Grossman |
| 2004/0119760 | A1 | 6/2004 | Grossman |
| 2004/0122683 | A1 | 6/2004 | Grossman |
| 2004/0122822 | A1 | 6/2004 | Thompson ............... 707/100 |
| 2004/0139025 | A1 | 7/2004 | Coleman |
| 2004/0177082 | A1 | 9/2004 | Nitta |
| 2004/0210844 | A1 | 10/2004 | Pettinati |
| 2004/0221309 | A1* | 11/2004 | Zaner et al. ............... 725/46 |
| 2004/0235520 | A1 | 11/2004 | Cadiz |
| 2004/0236792 | A1 | 11/2004 | Celik |
| 2004/0243935 | A1 | 12/2004 | Abramovitch |
| 2004/0260948 | A1 | 12/2004 | Miyata |
| 2005/0002510 | A1 | 1/2005 | Elsey |
| 2005/0004874 | A1 | 1/2005 | Gilmour |
| 2005/0015439 | A1 | 1/2005 | Balaji |
| 2005/0080805 | A1 | 4/2005 | Haeberle |
| 2005/0091072 | A1 | 4/2005 | Dunn |
| 2005/0114329 | A1 | 5/2005 | Dettinger |
| 2005/0131888 | A1 | 6/2005 | Tafoya |
| 2005/0182741 | A1 | 8/2005 | Grossman ............... 707/1 |
| 2005/0262208 | A1 | 11/2005 | Haviv |
| 2005/0283468 | A1 | 12/2005 | Karnvar |
| 2006/0010104 | A1 | 1/2006 | Pettinati |
| 2006/0041545 | A1 | 2/2006 | Heidloff |
| 2006/0053384 | A1 | 3/2006 | Le Fetra |
| 2006/0064645 | A1 | 3/2006 | Neven |
| 2006/0174002 | A1 | 8/2006 | Shrinivasan |
| 2006/0253787 | A1 | 11/2006 | Fogg |
| 2006/0277213 | A1 | 12/2006 | Robertson |

FOREIGN PATENT DOCUMENTS

| | | |
|---|---|---|
| JP | 9-503088 | 3/1997 |
| JP | 2000-315234 | 11/2000 |
| JP | 2002-517863 | 6/2002 |
| JP | 2002-312404 | 10/2002 |
| WO | 95/23371 | 8/1995 |
| WO | WO 95/23371 | 8/1995 |
| WO | 99/64970 | 12/1999 |
| WO | WO 99/64970 | 12/1999 |
| WO | WO 01-80190 | 1/2001 |
| WO | WO 02/073454 | 9/2002 |

WO 2005013079 10/2005

OTHER PUBLICATIONS

Hibbert, Chris, "Visual Flex and XML", downloaded from www.dataaccess.com/whitepapers/xml/XMLWP.htm, dated by Wayback Machine as: May 2, 2001, pp. 1-25.
Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.
Ren, Ligang, et al., "Data Synchronization in the Mobile Internet", The 7$^{th}$ Intl. Conf on CSCW in Design, Sep. 25-27, 2002, pp. 95-98.
Lee, Jinho, et al., "An Evaluation of the Incorporation of a Semantic Network Into a Multidimensional Retrieval Engine", CIKM '03 New Orleans, LA, Nov. 3-8, 2003, pp. 572-575.
Su, Hong, et al., "Automating the Transformation of XML Documents", WIDM 2001, Atlanta, GA, Nov. 2001, pp. 68-75.
McCabe, M. Catherine, et al., "On the Design and Evaluation of a Multi-Dimensional Approach to Information Retrieval", SIGIR 2000, Athens, Greece, Jul. 2000, pp. 363-365.
Bussler, Chrisoph, et al., "A Conceptual Architecture for Semantic Web Enabled Services", SIGMOD Record, vol. 31, No. 4, Dec. 2002, pp. 24-29.
Nejdl, Wolfgang, et al., "Edutella: A P2P Networking Infrastructure Based on RDF", WWW 2002, Honolulu, HI, May 7-11, 2002, pp. 604-615.
Bychkov, Yury, et al., "Interactive Migration of Legacy Databases to Net-Centric Technologies", Proceedings of the 8$^{th}$ Working Conference on Reverse Engineering, Oct. 2-5, 2001, pp. 328-334.
Bakker, John-Luc, et al., "Next Generation Service Creation Using XML Scripting Languages", IEEE International Conference on Communications, vol. 4, Apr. 22 May 2, 2001, pp. 2001-2007.
Padwick, Feddema, Special Edition Using Microsoft Outlook 2000, Que, Ch. 9 'Managing Contacts', pp. 1-17.
Padwick, Feddema, Special Edition Using Microsoft Outlook 2000, Que, Ch. 16 'Managing Your Computer Environment': Using Other Shortcuts in the Outlook Bar, pp. 1-4.
Padwick, Feddema, Special Edition Using Microsoft Outlook 2000, Que, Ch. 18 'Finding and Organizing Outlook Items': Using the QuickFind Contact Tool, pp. 1-4.
Padwick, Feddema, Special Edition Using Microsoft Outlook 2000, Que, Ch. 18 'Finding and Organizing Outlook Items': Organizing Outlook Items, pp. 1-7.
Padwick, Feddema, Special Edition Using Microsoft Outlook 2000, Que, Ch. 22 'Creating and Using Rules', pp. 1-5.
Padwick, Feddema, Special Edition Using Microsoft Outlook 2000, Que, Ch. 38 'Creating Views and Print Styles', pp. 1-25.
Padwick, Feddema, Special Edition Using Microsoft Outlook 2000, Que, Ch. 41 'Creating and Using Custom Fields': Why Do You Need Custom Fields?, pp. 1-14.
Padwick, Feddema, Special Edition Using Microsoft Outlook 2000, Que, Ch. 41 'Creating and Using Custom Fields': Creating a Simple Custom Field, pp. 1-3.
Padwick, Feddexa, Special Edition Using Microsoft Outlook 2000, Que, Appendix C 'Outlooks's Files, Folders, Fields, and Registry Keys', p. 1.
Office Action mailed Jun. 22, 2007 cited in related U.S. Appl. No. 10/692,257.
Notice of Allowance mailed Mar. 27, 2007 cited in related U.S. Appl. No. 10/324,251.
Office Action mailed Aug. 3, 2007, cited in related U.S. Appl. No. 10/324,243.
Office Action mailed Jun. 5, 2007, cited in related U.S. Appl. No. 10/885,974.
Notice of Allowance mailed Aug. 9, 2007, cited in related U.S. Appl. No. 10/324,250.
Notice of Allowance mailed Jul. 3, 2007, cited in related U.S. Appl. No. 10/324,746.
Notice of Allowance mailed Aug. 8, 2007, cited in related U.S. Appl. No. 10/326,660.
Anderson, T., Change Your Outlook, Developer Network Journal, No. 25, p. 50-1, Jul.-Aug. 2001.
Taylor, T.C., Databases Save Time and Customers, Sales & Marketing Management, vol. 142, No. 4, p. 105-7, March 1990.
Kubota, K.; Masuno, H., Multi-Media Software PI, NEC Technical Journal, vol. 41, No. 13, p. 72-6, Nov. 1988.
Pettigrew, T., ACT! —Automated Contact Tracking, CA Magazine, vol. 95, No. 1022, p. 48-9, Sep. 1991.
Simaioforidis, A.; Karlgren, J,; Ereback, A., Research and Advanced Technology for Digital Libraries, Second European Conference, ECDL '98. Proceedings, p. 673-4, Sep. 21-23, 1998.
Heller, S.R., Symantec ACT! 4.0 for Windows, Journal of Chemical Information and Computer Sciences, vol. 38, No. 4, p. 772, Jul.-Aug. 1998.
Microsoft Computer Dictionary, 2002, Microsoft Press, 5th edition, p. 162.
Office Action dated Sep. 30, 2008 cited in U.S. Appl. No. 10/324,243.
Office Action dated Oct. 27, 2008 cited in U.S. Appl. No. 10/692,257.
Notice of Allowance dated Mar. 30, 2009 cited in U.S. Appl. No. 10/692,257.
Office Action dated Jun. 10, 2009 cited in U.S. Appl. No. 10/324,243.
U.S. Appl. No. 12/195,214 filed Aug. 20, 2008, Pettinati.
By Gordon Padwick, Helen Feddma; ProQuest Information and Learning—"Special Edition Using Microsoft Outlook 2000"; Publisher; Que; Pub Date: May 12, 1999; "Safari Tech Books, Online".
Zhan, H. F., et al., "A Web-Based Collaborative Product Design Platform for Dispersed Network Manufacturing", Journal of Materials Processing, vol. 138, Isssues 1-3, Jul. 20, 2003, pp. 600-604.
Huynh, David, et al., "Haystack: a Platform for Creating, Organizing and Visualization Information Using RDF", Semantic Web Workshop (atWWW2002), Honolulu, HI, May 2002, pp. 1-11.
Getting Results with Microsoft Office 97, Microsoft Corp., Redmond, WA, © 1997, pp. 28-31, 345-374 and 470-471.
Padwick, Gordon et al., Special Edition Using Microsoft Outlook 2000, Que Corp., Indianapolis, IN, May 1999, pp. 370-376, 382-386 and 392-396.
Morrison, Michael et al., XML Unleashed, SAMS Corp., Indianapolis, IN, Dec. 1999, pp. 26-37, 84-104 and 106-122.
Office Action dated Jun. 6, 2006 cited in U.S. Appl. No. 10/324,746.
Office Action dated Feb. 26, 2007 cited in U.S. Appl. No. 10/324,746.
Notice of Allowance dated Sep. 7, 2007 cited in U.S. Appl. No. 10/327,746.
Office Action dated Apr. 6, 2007 cited in U.S. Appl. No. 10/845,464.
Office Action dated Jan. 28, 2008 cited in related U.S. Appl. No. 10/845,464.
Notice of Allowance dated May 19, 2008 cited in U.S. Appl. No. 10/845,464.
Notice of Allowance dated Jun. 13, 2008 cited in U.S. Appl. No. 10/885,974.
Office Action dated Apr. 5, 2006 cited in U.S. Appl. No. 10/324,250.
Office Action dated Sep. 22, 2006 cited in U.S. Appl. No. 10/324,250.
Office Action dated Feb. 7, 2007 cited in U.S. Appl. No. 10/324,250.
Notice of Allowance dated Nov. 16, 2007 cited in U.S. Appl. No. 10/324,250.
Office Action dated Apr. 14, 2006 cited in U.S. Appl. No. 10/324,251.
Office Action dated Nov. 3, 2006 cited in U.S. Appl. No. 10/324,251.
Office Action dated Jan. 22, 2007 cited in U.S. Appl. No. 10/324,243.
Office Action dated Mar. 24, 2008 cited in U.S. Appl. No. 10/324,243.
Office Action dated Apr. 3, 2006 cited in U.S. Appl. No. 10/324,246.
Office Action dated Oct. 31, 2006 cited in U.S. Appl. No. 10/324,246.
Office Action dated Mar. 21, 2007 cited in U.S. Appl. No. 10/324,246.
Notice of Allowance dated Oct. 4, 2007 cited in U.S. Appl. No. 10/324,246.
Notice of Allowance dated Dec. 13, 2007 cited in U.S. Appl. No. 10/324,246.
Office Action dated Apr. 17, 2006 cited in U.S. Appl. No. 10/326,660.
Office Action dated Oct. 16, 2006 cited in U.S. Appl. No. 10/326,660.
Office Action dated Feb. 8, 2007 cited in U.S. Appl. No. 10/326,660.
Notice of Allowance dated Nov. 16, 2007 cited in U.S. Appl. No. 10/326,660.
Office Action dated Sep. 13, 2006 cited in U.S. Appl. No. 10/780,496.
Office Action dated Mar. 16, 2007 cited in U.S. Appl. No. 10/780,496.

Office Action dated Feb. 7, 2008 cited in U.S. Appl. No. 10/780,496.
Office Action dated Nov. 16, 2007 cited in U.S. Appl. No. 10/692,257.
Office Action dated Apr. 7, 2008 cited in U.S. Appl. No. 10/692,257.
Kim, Sung Wan, et al., "Developing a Native Storage Structure for XML Repository System in Main Memory", 5th International Conference on High Speed Networks and Multimedia Communications, © 2002, pp. 96-100.
Shui, William M., et al., "Application of XML Schema and Active Rules System in Management and Integration of Heterogeneous Biological Data", BIBE '03, Mar. 10-12, 2003, pp. 367-374.
Banerjee, Sandeepan, et al., "Oracle8i—The XML Enabled Data Management System", 16th International Conference on Data Engineering, San Diego, CA Feb. 29-Mar. 3, 2000, pp. 561-568.
Haas, L.M., et al. "Transforming Heterogeneous Data with Database Middleware: Beyond Integration", Bulletin of the IEEE Computer Society Technical Committee on Data Engineering, © 1997, pp. 1-6.
Nambiar, Uilas, et al., "Current Approaches to XML Management", IEEE Internet Computing, vol. 6, Issue4, Jul./Aug. 2002, pp. 43-51.
Lear, Ann C., et al, "XML Seen as Integral to Application Integration", IT Professional, vol. 1, Issue 5, Sep./Oct. 1999, pp. 12-16.
Paul McFedries, Complete Idiot's Guide to Windows XP, Pub Date: Oct. 3, 2001. pp. 1-3.
Paul Thurrott's SuperSite for Windows: Internet Explorer 5.0 Reviewed. Duke Communications International, Inc. 2000. pp. 1-8.
Office Action dated Aug. 17, 2007 cited in related U.S. Appl. No. 10/780,496.
Office Action dated Aug. 23, 2007 cited in related U.S. Appl. No. 10/845,464.
Office Action dated Oct. 5, 2007 cited in related U.S. Appl. No. 10/885,974.
Notice of Allowance dated Oct. 2, 2007 cited in related U.S. Appl. No. 10/324,250.
Notice of Allowance dated Oct. 5, 2007 cited in related U.S. Appl. No. 10/326,660.
Notice of Allowance dated Oct. 6, 2009 cited in U.S. Appl. No. 10/324,243.
U.S. Appl. No. 12/195,214 filed Jul. 22, 2010, Notice of Allowance.
U.S. Appl. No. 12/195,214 filed Jun. 10, 2010, Office Action.

* cited by examiner

CONTACT PAGE

CROSS-REFERENCE TO RELATED APPLICATIONS

The present application is a continuation of, and claims priority to U.S. patent application Ser. No. 10/324,251, which was filed Dec. 19, 2002 and entitled "Contact Page." The foregoing application is incorporated herein by reference in its entirety.

BACKGROUND OF THE INVENTION

1. The Field of the Invention

The present invention relates to user interface menus in computers and electronic devices and, more particularly, to methods, systems, and computer program products for displaying contact information with a user interface.

2. Background and Relevant Art

A contact management system is generally referred to in this application as a system, directory or database that contains contact information about people, groups, organizations, businesses, or any other identifiable entity, each of which is referred to herein as a contact.

Contact management systems are extensively used in the computer industry to store and display contact information that is pertinent to the corresponding software applications to which they belong. For example, email applications typically include directories for storing and displaying the email addresses of contacts that can be emailed. Money management applications typically include directories for storing contact information about related financial contacts, such as, for example, banks, accounting service organizations, financial planning organizations, and so forth. Other examples of software applications that utilize contact management systems include time management applications, instant messaging applications, network gaming applications, business directory applications, telephony applications, and so forth.

Contact management systems are also widely used in many hardware devices that are not considered traditional computers. For example, many telephones, facsimile devices, and photocopying devices also include contact management systems for storing contact information that may be used to perform a desired function such as initiating a telephone call, a facsimile transmission, or a telecopy transmission.

One problem encountered by existing contact management systems, however, is that the large variety of specialized and disparate contact management systems can make it difficult for a user to quickly access all available contact information for the various applications at the same time. This can be a problem, for example, when a user desires to identify all available means for making contact with a given entity because it may require the user to separately access various directories from many different contact management systems in order to obtain the desired contact information. For example, it may be necessary to access a telephone directory to obtain the home or cell telephone number for the contact, an email directory to obtain a primary email address for the contact, a business directory to obtain the business telephone number, and business email address of the entity, and so forth.

Having disparate contact management systems can also be a problem for obtaining different types of contact information about different contacts. For example, it may be desirable to view the email address of a first contact, the business telephone number of a second contact, and the cell telephone number of a third contact. If the desired contact data for each of the different entities is located in a different contact management system of different applications, then each application will have to be accessed to obtain the desired information, thereby requiring the undesirable expenditure of time and resources.

Searches and queries for specific contacts or contact information must also be performed separately on each of the various contact management systems. This can particularly be a problem when a user has forgotten in which of the contact management system directories the contact information is stored.

To overcome some of these problems, some contact management systems are configured to store more contact information then is required for the corresponding application. For example, an email directory may be configured to store the addresses, phone numbers and other information about the various contacts stored therein. However, the interfaces and limitations for displaying contact information typically vary from one application to the next, thereby making it difficult to become customized to the various contact management systems. Furthermore, it would be somewhat onerous to duplicatively enter every piece of contact information about every contact into every utilized contact management system, even if it were possible. This redundant storage would also represent undesirable and unnecessary expenditure of resources.

Yet another problem with existing systems is that they lack extensibility. In particular, existing contact management systems are dedicated to particular applications and are not extensible to other applications for which they are not originally created. This inhibits the sharing and searching of contact information from the various contact information directories of the various applications.

Accordingly, there currently exists a need in the art for improved contact management systems and interfaces for accessing contact information.

BRIEF SUMMARY OF THE INVENTION

The present invention is directed to computer program products and interfaces for accessing contact information about one or more contacts and for providing access to communication histories and files that are associated with the contacts.

According to one embodiment, a user interface and a computing system operate to provide contact information corresponding with a predetermined contact. The contact information is displayed at the computing system upon receiving a user request for the contact information. The user request may include a query, a selection from a menu or display object, or any other known means for entering a user request. The requested contact information that is displayed may include general contact information, such as the name(s), email address(es), and phone number(s) of the contact, an image of the contact, as well as keywords and notes associated with the contact.

The contact information may also include status information, indicating whether the contact is online, offline, at work, at home, or at some other location. In certain embodiments, the contact information may also include other information, such as the contact's birth date, notices of recent communication from the contact, and so forth. Contact information can also include associations with corresponding files and relationships with other contacts.

The contact information provided for the predetermined contact may be obtained from one or more contact information directories utilized by one or more application programs. In some instances, contact information about a contact is obtained from public and private directories that are accessible to the computing system. For example, a public MSN directory may publish a profile corresponding with the predetermined contact, a private organization may also provide certain contact information about the contact. The contact information may also be published or otherwise provided by the contact. For example, the contact may supply an image for display with the contact information.

The user interface may also display contact-centric tasks that may be performed with the predetermined contact based upon the software and hardware capabilities of the computing system that is utilizing the user interface and the contact's computing system(s). Contact-centric tasks may include, for example, instant messaging and chat capabilities, gaming capabilities, telephony capabilities, and so forth. Contact-centric tasks can also include actions or tasks that can be performed on a contact (e.g., add a contact to a group, edit contact information associated with the contact, and so forth).

The user interface may also provide a link to a communication history of the contact. When a user selects the link, or otherwise provides a request to view the to the communication history of the contact, the user interface displays a record of communications with the contact. This record may include communications and files generated from a variety of communication software, including instant messaging, email, facsimile, telephony, imaging, and so forth.

The user interface may also provide a link to files associated with the contact. When a user selects the link, or otherwise provides a request to view the files associated with the contact, the user interface displays the files in one or more directories that have been associated with the contact. The files may be determined to be associated with the contact based on the file properties and attributes (e.g., location, author, keyword, and so forth).

The user interface also provides a window for editing the contact information and for setting preferences for the manner in which the contact information is displayed. For example, notes and keywords may be assigned to a contact. A preferred email, phone and address of the contact may also be selected for display in various embodiments of the user interface.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to improved methods, systems, and corresponding computer program products and interfaces for obtaining desired contact information from one or more contact information directories. The embodiments of the present invention may comprise or be performed with a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
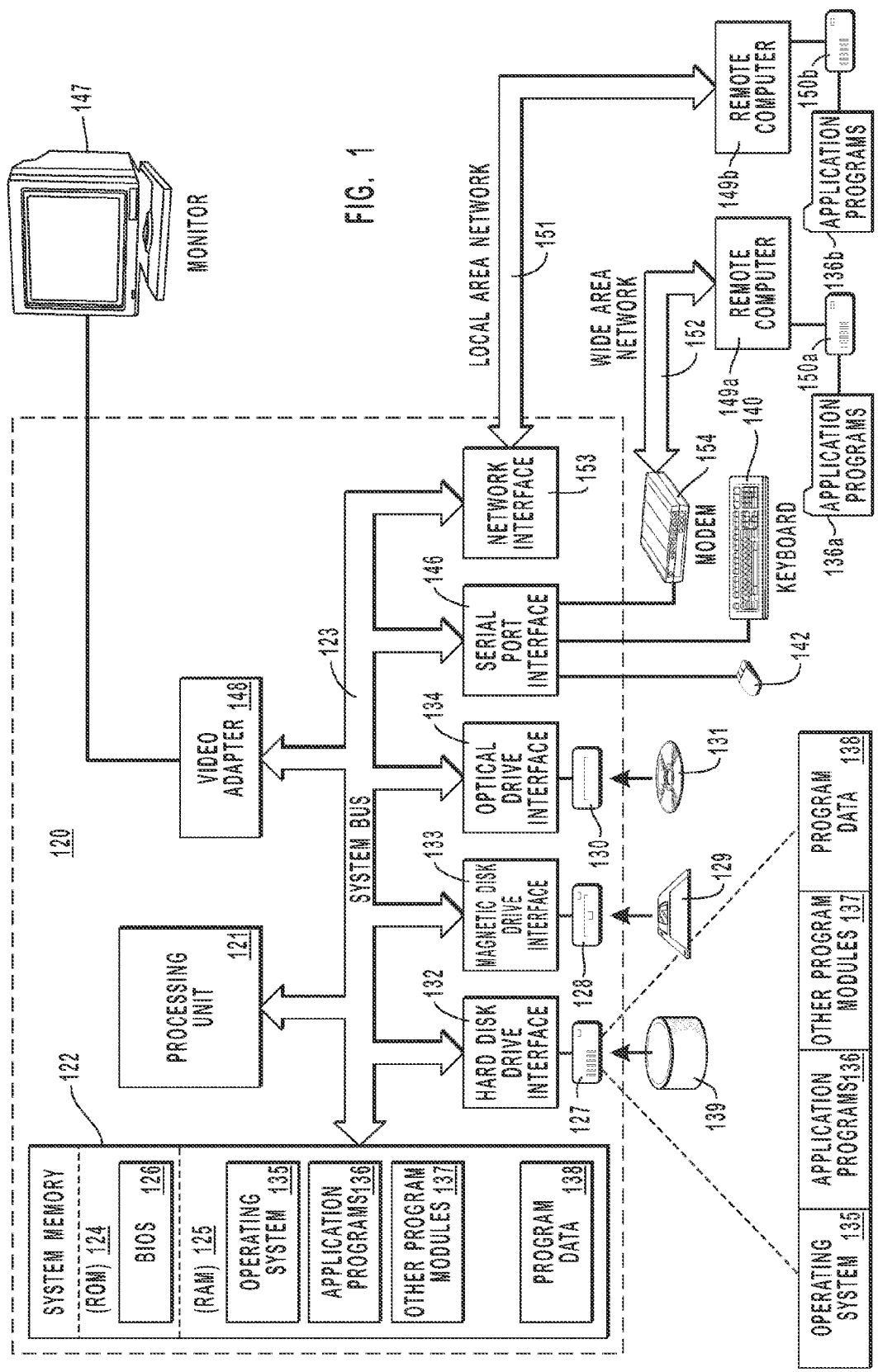
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 20 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
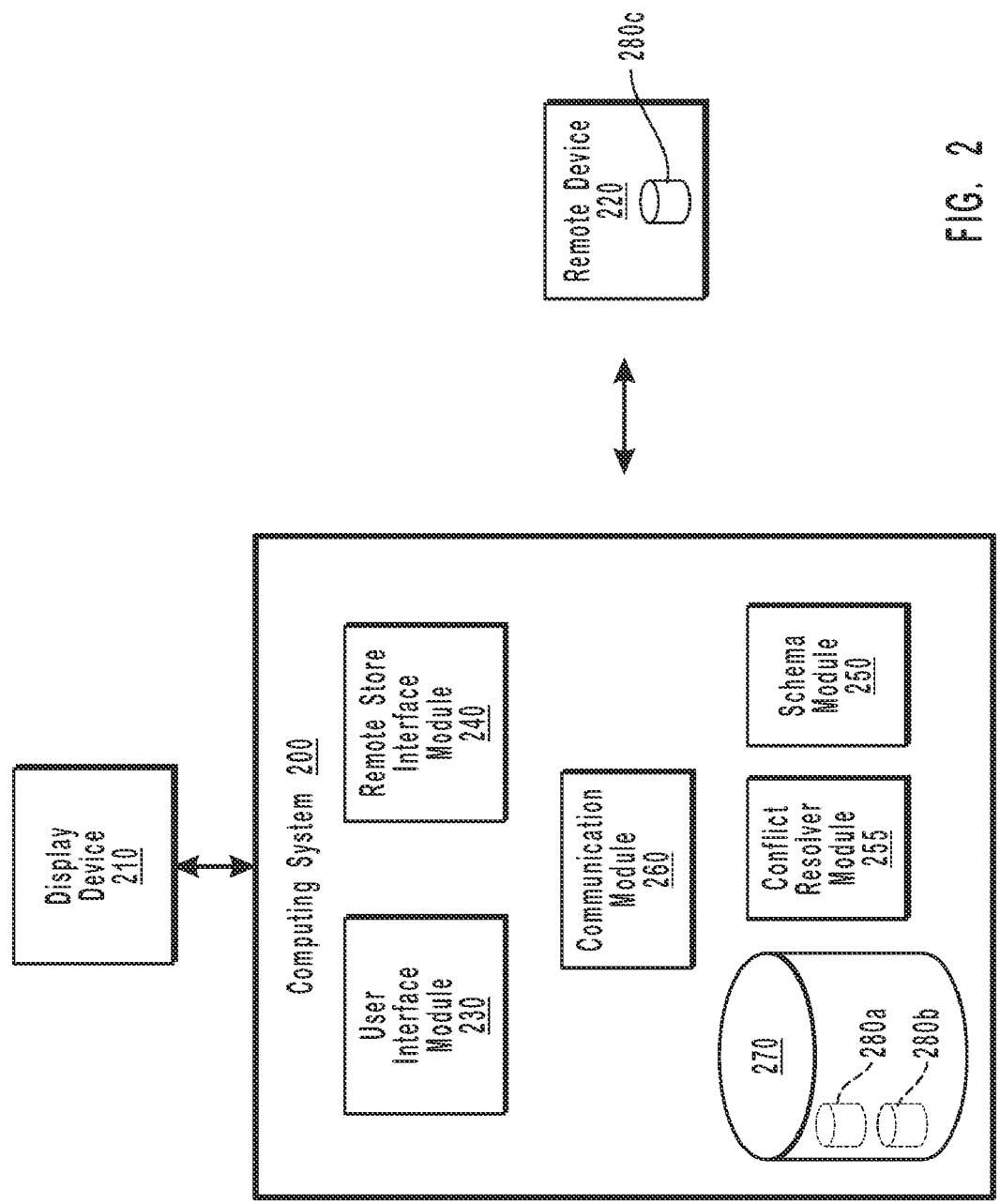
FIG. 2 illustrates one embodiment of a functional block diagram of a computing system that is connected with a display device and a remote device and that includes various computer modules for implementing methods of the invention.

FIG. 2 illustrates a functional block diagram of several components of a computing system and the user interface of the invention. In the present embodiment, the computing system 200 is connected with a display device 210 and a remote device 220. The connection link between each of these components may be a physical connection or a wireless connection. It will be appreciated that the display device 210 may be located remotely from the computing system 200 or integrally connected with the computing system 200. The display device 210 may comprise any screen, monitor, or other device that is configured to display images and/or text.

During use the computing system utilizes a user interface to display the requested data at the display device. As defined herein, the requested data includes the contact information (this contact information may include basic data like phone numbers, email addresses, IM addresses, and so forth, as well as complex data like online presence, free/busy information, important dates, web page URLs, and relationships to other contacts like spouses, groups, other companies, and so forth), communication history, and associated files of a contact that are requested by a user. Contact information may also include identity keys (e.g., PINS and other character strings that identify the contact on a particular system). The functionality of the user interface to display this requested desired data is enabled by various computer modules, such as user interface module 230, remote store interface module 240, schema module 250 and communication module 260, each of which will now be described.

The user interface module 230 includes sufficient computer executable instructions for operably displaying a user interface at the display device and for responding to user input entered at the user interface. The remote store interface module 240 includes sufficient computer executable instructions for searching and processing contact information stored at remote devices, such as remote device 220. Remote device 220 may be a remote computer, server containing contact information. Although only a single remote device 220 is shown, it will be appreciated that the computing system may be connected with any number of remote devices. It will likewise be appreciated that the computing system 200 does not necessarily need to be connected with a remote device 220 to enable the invention.

The schema module 250 contains sufficient computer executable instructions for mapping contact information, files, and communication histories into categories and classifications that can be recognized by the user interface for display on the display device 210. The categories and classifications defined by the schema module 250 enable the desired data contact information to be filtered and displayed into the designated categories and classifications, as described below. The schema module 250 is useful for enabling the requested data that is accessed from remote stores to be organized according to a single unifying schema. The schema module 250 can also be used to map and identify the requested data that is stored in local stores, such as storage media 270.

The communication module 260 includes sufficient computer executable instructions for enabling communication between the various modules, as well as the display device 210, the remote device 220, and the storage media of the remote device 220 and computing system 200. In particular, the communication module enables the modules to access and process contact information, communications, and files that are stored in one or more directories that may be stored locally and remotely.

The present embodiment illustrates three directories, 280a, 280b, and 280c that correspond with different applications. By way of example, and not limitation, directory 280a may correspond with an email directory, directory 280b may correspond with a telephony directory. It will be appreciated, however, that the invention is not limited to use with any particular number of contact information directories or applications to which they correspond.

Contact Page

Figure 3:
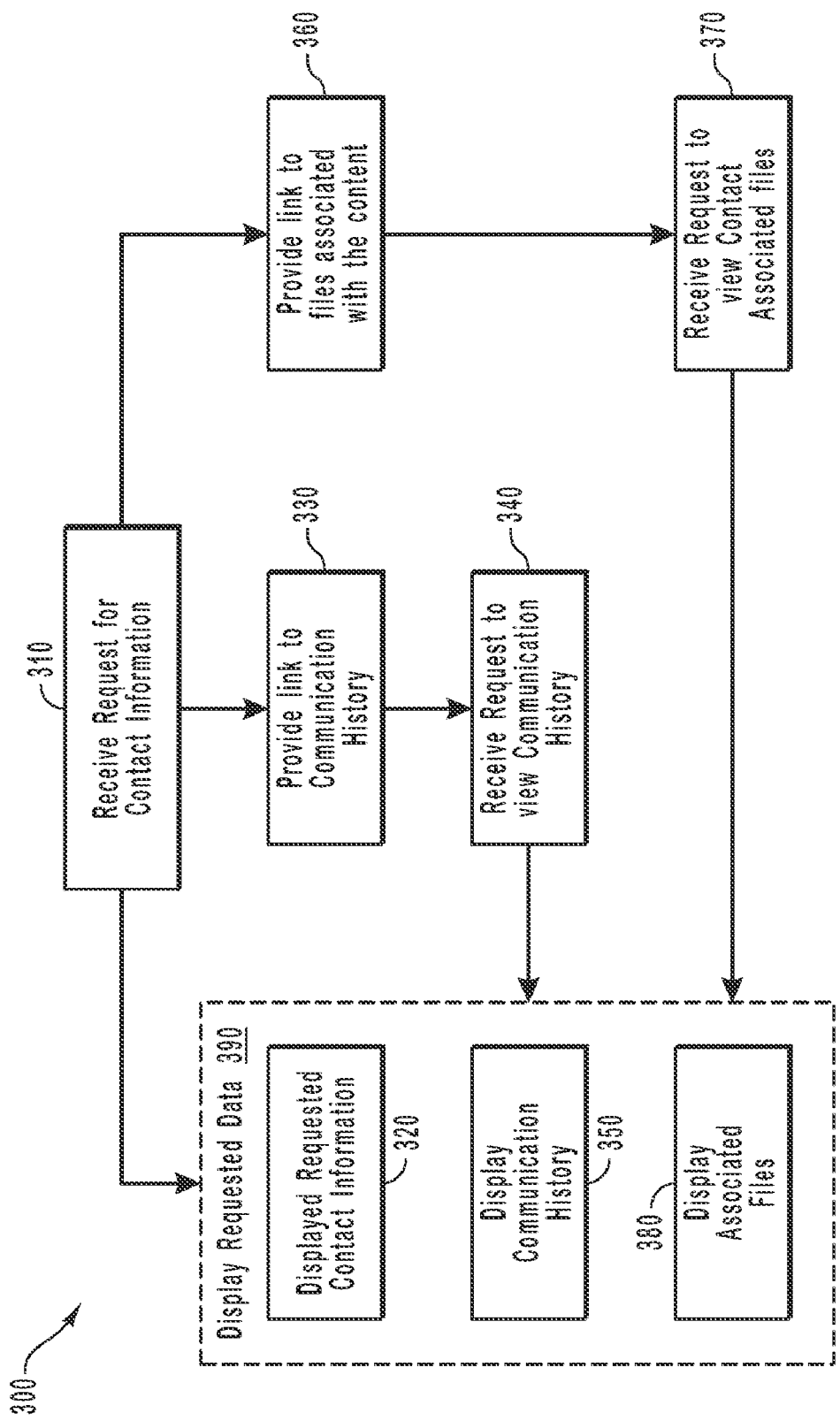
FIG. 3 is a flow chart illustrating certain acts of a method for displaying requested contact information, communication history and associated files of a contact.

FIG. 3 illustrates a flowchart 300 of methods for displaying requested data from one or more heterogeneous directories. More particularly, the flowchart 300 illustrates methods for displaying the contact information, communication history, and files that are associated with a contact. As suggested above, the requested data may be aggregated from a plurality of disparate directories or data stores or obtained from a single directory or data store.

As illustrated, the flowchart 300 includes various acts for displaying the requested data, each of which will now be described. Some of the illustrated acts will also be described with specific reference to FIGS. 4-7.

Initially, a user request for contact information is received at the computing system 200 (act 310). This request can include a query or search for contact information about a predetermined contact. The request for contact information may also include a selection of a name, symbol or image that corresponds to the contact from a menu or a display. Any other known means for entering a user request for contact information may also be utilized. Upon receiving the user request for contact information, the user interface displays the requested contact information at the display device 210 (act 320).

Figure 4:
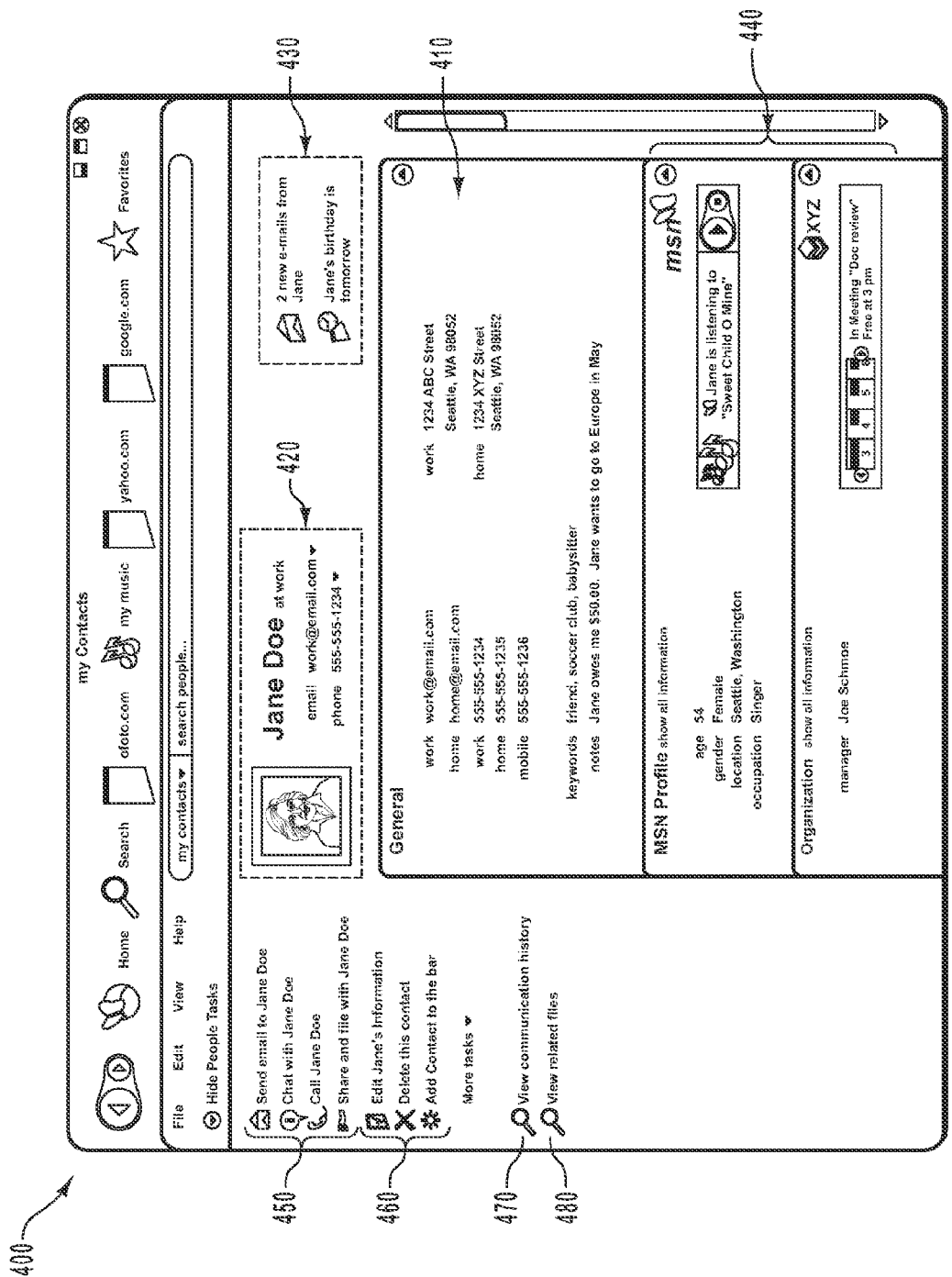
FIG. 4 illustrates one embodiment of the user interface of the invention in which contact information is displayed with contact-centric tasks and links to a communication history and associated files of a contact.

FIG. 4 illustrates one embodiment of the user interface 400 of the invention for displaying contact information (act 320). As shown at 410, some general contact information including email addresses, phone numbers, and addresses associated with the contact (Jane Doe) are displayed by the user interface 400. The contact information also includes note and keywords that have been associated with the contact by the user or another entity.

Some contact information is displayed in a condensed form that includes the contact's name, image, online status, and email addresses and phone numbers, birth date, spouse, employment information (company, title, manager, direct reports, office #, etc), free/busy, children, etc., as shown at 420. The present status of the contact (e.g., at work, online, at home, etc.) may be determined by the computing system 200. Alternatively, the status may be published by the contact and sent to the computing system 200. The status may also be determined by any other suitable manner, including, but not limited to notifications that are sent by a server or other remote computer to the computing system 200.

The preferred email and phone number that are displayed with the condensed contact information at 420 can relate directly to the status of the contact. For example, if the contact is at work, the preferred email and phone number may include the work email and work phone number. Alternatively, the preferred email and phone number may be predetermined and published by the contact. The preferred email and phone number may also be designated by the user via the edit mode of the user interface, as described below in reference to FIG. 7. According to one embodiment, the displayed contact information includes all email addresses and phone numbers that are known to be associated with the contact (e.g., home, work, cell, fax, alternate, vacation home, additional lines, and so forth) with an indication as to which of the known email addresses and phone numbers are preferred.

The image of the contact that is displayed with the contact information, at 420, may be published by the contact or provided by the user. The image may also be provided or published by any other entity.

As shown by FIG. 4 at 430, the contact information may also include the birthday of the contact, notifications of communications received by the contact, and any other desired contact information.

The contact information that is displayed by the user interface 400, may be obtained from one or more directories that are located in one or more local stores and/or in one or more remote data stores, as mentioned above. If the contact information is obtained from a plurality of directories, the contact information may be displayed in a format that visually indicates what directories the contact information came from.

For example, certain contact information corresponding to a MSN profile, and obtained from a MSN server, may be provided in a frame 440 separated from the frame 410 of the general contact information. As shown, the contact information provided by the MSN profile includes a status indication that the contact is currently listening to music. Certain contact information related to an organization, and retrieved from an organization server, is also displayed in a separate frame 440. The contact information provided by the organization server includes a status indication that the contact is currently scheduled for a meeting. It will be appreciated that the present example is merely illustrative as to certain types of contact information that may be aggregated and displayed according to the invention, and is not intended to limit the scope of the invention. Rather any variety of contact information may be displayed.

According to one embodiment, the contact page interface is utilized in combination with one or more APIs through which third parties can add relevant information about the contact and that can be displayed on the contact page. Any contact information supplied by a third party through the one or more APIs may be displayed in frame 440 or another portion of the contact page.

FIG. 4 also illustrates how the user interface can be used to display other information, not considered traditional contact information. For example, the user interface 400 can display contact-centric tasks 450 that can be used to initiate an activity or communication with the contact. These contact-centric tasks 450 are preferably, but not necessarily, limited to the tasks that can be performed between the computing system 200 and a remote computing system of the contact. A determination as to what tasks can be performed between the user and the contact is a function of the software and hardware capabilities of the computing system 200 and the contact's computing system. For example, if both the computing system 200 and a remote computing system of the contact have a network game installed and are connected to the same network, then the contact-centric tasks 250 may include a link for launching the game between the user and the contact.

It will be appreciated that the scope of the invention is not limited to any number or type of contact-centric task that may be displayed. For example, contact-centric tasks can also include actions or tasks that can be performed on a contact (e.g., add a contact to a group, edit contact information associated with the contact, and so forth). According to one embodiment, a third party can include tasks at any time that can be displayed at the contact page through the use of one or more APIs. These APIs may comprise part of the computer-executable instruction of the modules described above, or comprise discrete APIs that are separate from the modules described above.

The user interface 400 may also display links 460 for editing, deleting or adding new contacts. One embodiment for editing contacts with the user interface 400 is described below in reference to FIG. 7.

According to one embodiment, the user interface 400 displays a link 470 to a contact communication history (act 330), as well as a link 480 to files that are associated with the contact (act 360). These links 470, 480 may include hypertext links, buttons, menu options, or any other suitable objects that are displayed by the user interface 400.

When the communication history link 470 is selected or another request to view a desired communication history is received (act 340), the user interface displays the desired communication history (act 350).

Figure 5:
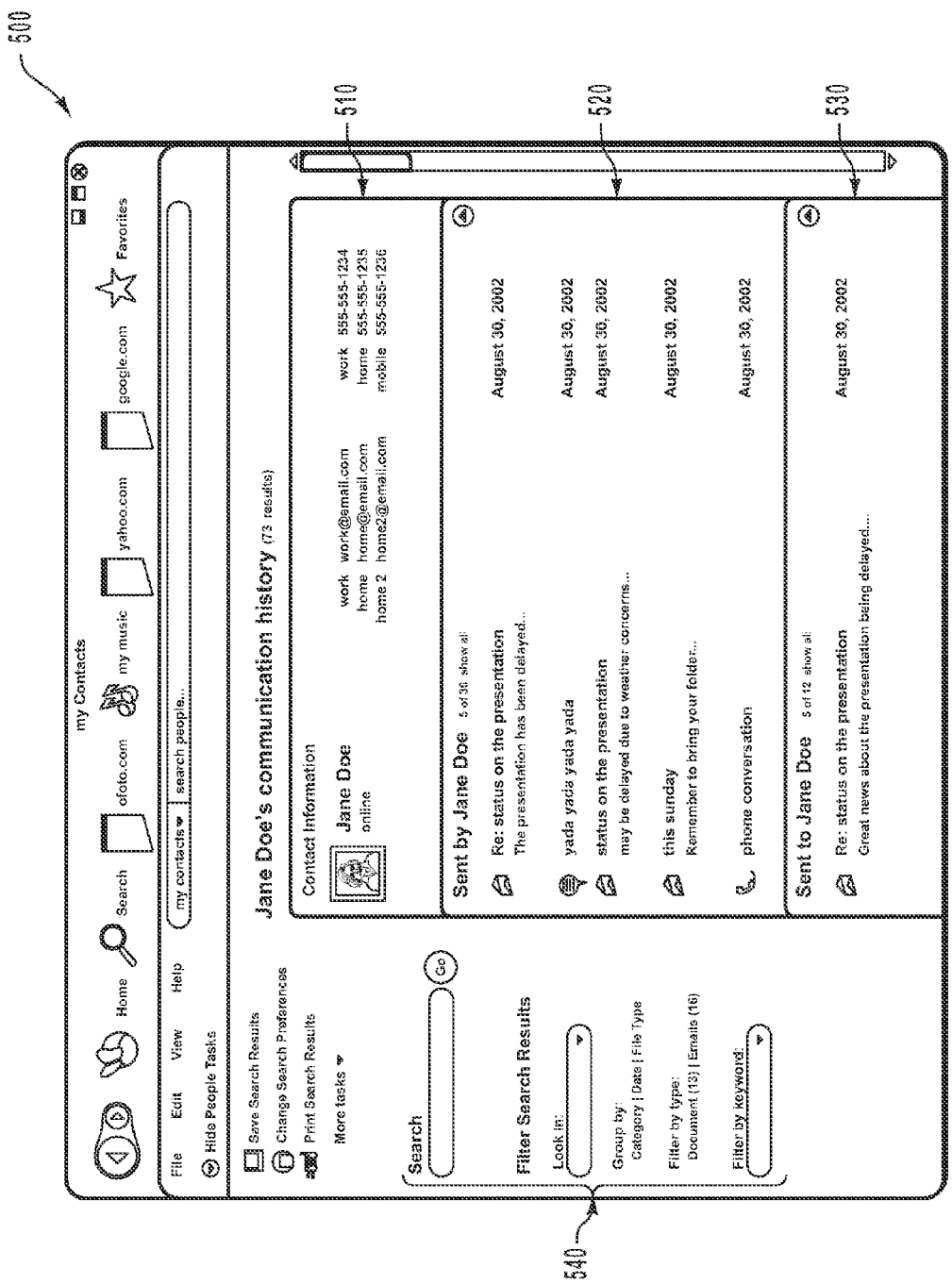
FIG. 5 illustrates another embodiment of the user interface of the invention in which contact information is displayed with a communication history of a contact.

FIG. 5 illustrates one embodiment of the user interface 500 in which contact information 510 is displayed along with the communication history of the contact. In this embodiment, the contact information 510 includes an image, name, and status of the contact, as well as certain email addresses and phone numbers of the contact.

The communication history includes a record of communications sent by the contact, shown at 520, and a record of communications sent to the contact, shown at 530. The types of communications that are displayed may include email messages, instant messaging messages, telephony communications, presentations, and any other types of communications. The displayed history of communications is obtained from one or more data stores corresponding with one or more communication applications (e.g., email, instant messaging, etc.). For convenience, the quantity of displayed messages may be limited (e.g., 5 of 36 sent by Jane Doe communications are displayed), as shown. To view the additional communications, traditional user interface features such as pull down menus, scroll bars, and any other objects may be provided to enable a user to view all of the communications.

FIG. 5 also illustrates that the user interface may include searching features 540 for searching for a particular communication. These search features may include type in lines for searching particular directories, filters for searching by categorization or classification defined by a schema, and filters for searching by keyword. These searching features 540 do not limit the scope of the invention, but merely illustrate that the communication history corresponding to a contact may be searched to find and display one or more desired communications from one or more directories and data stores.

Although the previous example is given with regard to searching for a communication within the communication history, it will be appreciated that the search functionality is not limited to searching through the communication history. Rather, the searching features 540 can be used to search for anything related to the contact, including, but not limited to contact information, keywords, and notes associated with the contact. For example, the searching features 540 may be displayed and used from the interface 400 shown in FIG. 4. The searching features may be used, for example, to search for other contacts that are related to the contact through the schema module 250, described above.

Figure 6:
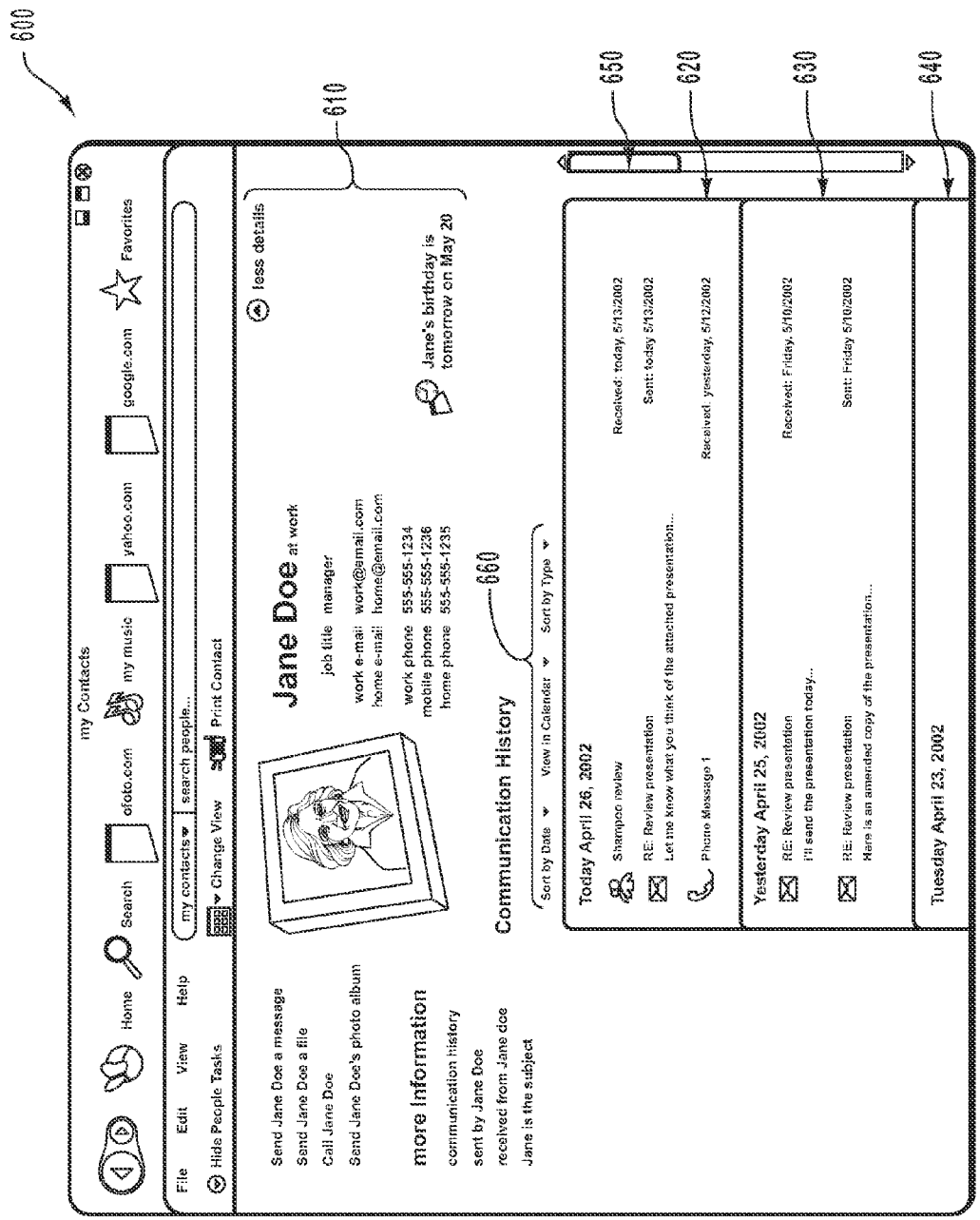
FIG. 6 illustrates another embodiment of the user interface of the invention in which contact information is displayed with a communication history of a contact that is displayed differently than the communication history of FIG. 5.

FIG. 6 illustrates another embodiment of the user interface 600 in which contact information 610 is displayed with a communication history of a contact. In this embodiment, the communication history is sorted by at least one of date and time, such that a first frame 620 shows communications from Apr. 26, 2002, a second frame 630 shows communications from Apr. 25, 2002, a third frame 640 shows communications from Apr. 23, 2002, and so forth. The communications from Apr. 23, 2002, are not presently visible, in the current embodiment, because of the size constraints of the user interface 600. However, the user interface 600 provides a scroll bar 650 for enabling a user to view communications from Apr. 23, 2002, as well as other dates. It will be appreciated that other tools may be used in lue of the scroll bar 650 to view the entire communication history.

It will also be appreciated that the format for displaying the communication history is not limited to the formats illustrated in FIGS. 5 and 6. For example, the communication history may also be formatted according to the type of communication that is sent or received (e.g., instant message, email, facsimile, telephony, and so forth), the week/month/year in which the communication is sent or received, or any other desired format. To enable a user to change the view of the communication history, a menu of options for altering the view or format of the communication history may be provided, such as, but not limited to menu 660.

As mentioned above, with reference to FIGS. 3 and 5, the user interface may provide a link 480 to files that are associated with the contact (act 360). When this link 480 is selected or another request from a user is received to view the contact associated files (act 370), the user interface displays the files associated with the contact (act 380). Files may be associated with a contact based on the properties and attributes of a file, such as, but not limited to the author, sender, recipient, subject (e.g., subject of a photo) and editor, of the file. A contact may also be associated with a file by keyword, link, and schema definitions, such as, for example, based on a relationship the contact has with another contact or based on the occurrence of the contacts name or other contact information within a file. The association of the files to the contact may occur locally, with the modules of the computing system 200, or at a remote device. It will be appreciated that the scope of the invention is not limited to any method for associating a contact to a file.

The scope of the invention is also not limited to any format for displaying the files that are determined to be associated with a contact. For example, the files may be displayed and sorted by file type, by file size, by file creation date, by file modification date, or any other format.

Attention is now redirected to FIG. 3. As shown, acts 320, 330, and 340, are shown to be encompassed within the step for displaying requested data (step 390). Although step 390 may include corresponding acts 320, 330 and 340, it will be appreciated that step 390 is not limited to the illustrated acts. Rather, step 390 may include any corresponding acts that are suitable for enabling the user interface to display requested data. Accordingly, step 300 may include any combination of corresponding acts 320, 330 and 340, as well as other suitable acts for displaying requested data.

Figure 7:
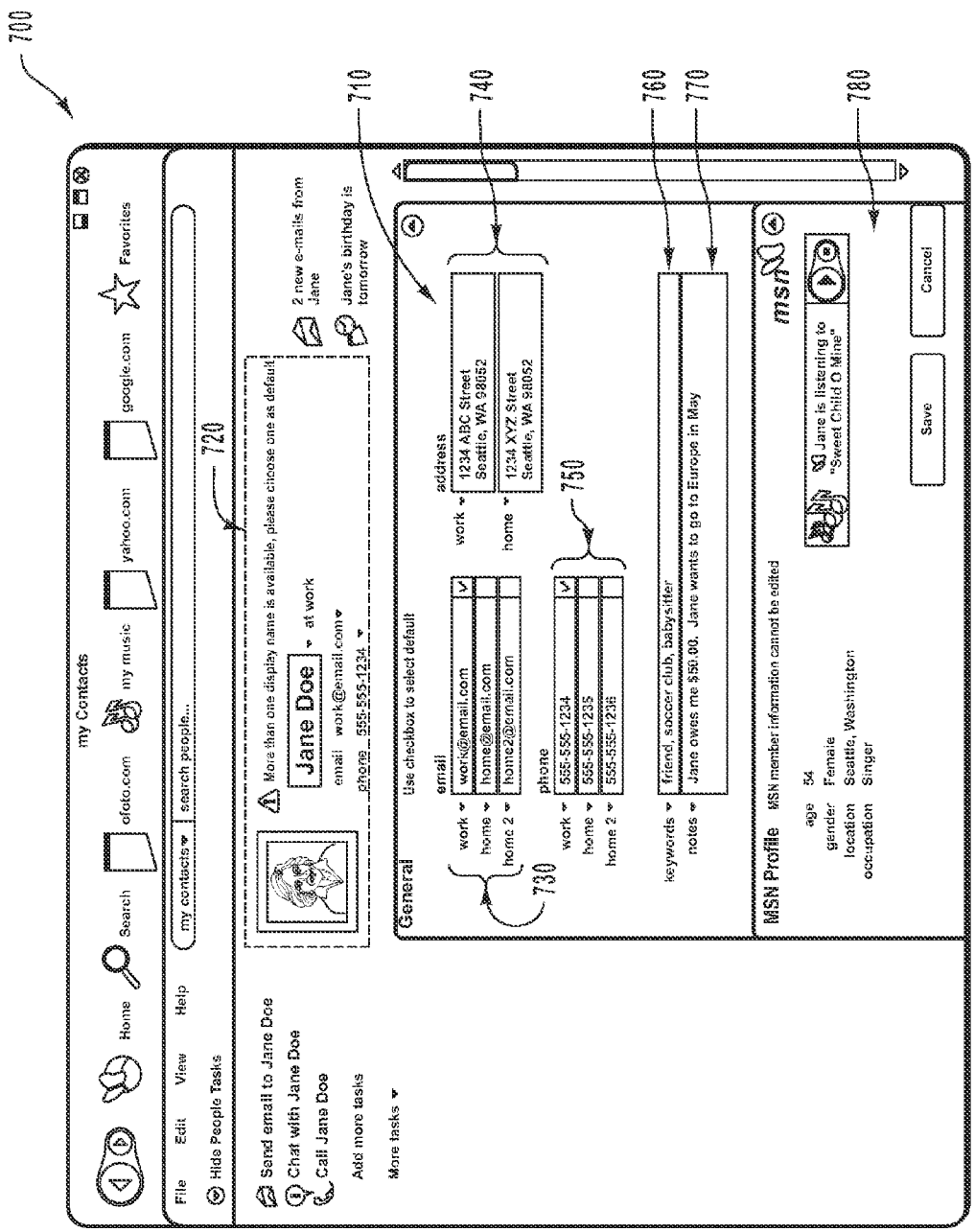
FIG. 7 illustrates one embodiment of the user interface of the invention in which contact information is displayed with fields that can be used to edit the contact information.

Although much of the foregoing disclosure is provided with reference to displaying requested data, it will be appreciated that the scope of the invention also extends to editing contact information for enabling the requested data to be displayed in a desired manner. For example, FIG. 7 illustrates one embodiment of the user interface 700 that may be used to edit contact information and designate a desired display format of the contact information. A user may advance to the embodiment of the user interface 700 shown in FIG. 7 by selecting an appropriate link from the selection of links 460 provided in FIG. 4.

This embodiment of the user interface 700, includes many of the same elements that have been described above. For example, the user interface 700 includes a frame 710 containing general contact information and a frame containing consolidated contact information 720. Unlike the previous embodiments, however, the contact information in the present embodiment is displayed in various fields that can edited by the user, including email address fields 730, physical address fields 740, phone number fields 750, keyword fields 760, and note fields 770 that are associated with a contact.

With the user interface 700, the user can manually enter or alter the content of contact information. Any modification to the contact information can be cached locally in storage medium 270 for reference at a later time, such as when the user subsequently requests the contact information of the contact (act 310). When a subsequent request for the contact information is received, the contact information may be obtained from the local storage in the format it was modified by the user. Alternatively, when a request for contact information is received, one or more directories in local and remote storage may be queried to provide the requested contact information, thereafter the user modifications to the contact information can be obtained from the local storage and applied to the contact information to provide the desired modified format of the contact information.

If the contact information stored in the local cache and any remote systems linked to the computing system 200 have different versions of contact information corresponding to the same contact, they can be synchronized periodically, or automatically upon making the modifications to the contact information.

Some contact information may not be modified, however. For example, the MSN profile 780, obtained from a remote store, may not be modified by the user in the present example because the user does not have authority to edit the MSN profile 780.

One purpose for enabling certain contact information to be edited is to provide the user the ability to control how the contact information is displayed. This may be accomplished, for example, by selecting the fields containing the contact information the user desires to be displayed with the consolidated contact information 720. For example, the work email is selected with a check, as is the work phone number, thereby causing the user interface 700 to display the work email and phone number with the consolidated contact information 720. The user can also provide keywords, in the keywords field 760, and notes in the notes field 770, thereby enhancing the ability to search for certain contacts with keyword searches.

In summary, the present invention enables a user to access contact information, communication histories and files associated with contacts from one or more data stores. The user interface of the invention also enables a user to edit the contact information. Although many of the examples provided above are made with specific reference to contacts comprising individuals (e.g., Jane Doe), it will be appreciated that the user interface may be utilized for accessing desired contact information, communication histories and files associated with any types of contacts, including, but not limited, to people, organizations, groups, businesses and other entities.

By way of example, and not limitation, a restaurant may comprise a contact, such that the user interface may be utilized to view associated files, communication histories and contact information corresponding with the restaurant. This could be useful, for example, to view files like the restaurant menu and communications like special food offers in an aggregate and consolidated manner, along with contact information for contacting the restaurant.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A user interface comprising:
    a display that is operably connected to a computing system that includes a processor and memory and which includes the following:
    a first interface display frame which displays a condensed form of contact information that identifies a contact and that can be used to initiate communication with the contact;
    a second interface display frame which is displayed with the first interface display frame, but that is distinguished from the first interface display frame on the display screen, and which displays general contact information corresponding to the contact; and
    an interface display object comprising a selectable link which is displayed with the first and second interface display frames and that directly links to a communications history page which displays a communication history between a user and the contact, wherein the contact information displayed in the condensed form within the first interface display frame, as well as the general contact information displayed within the second interface display frame are displayed by the first and second display frames, respectively, in an editable format.

2. A user interface as recited in claim 1, wherein the user interface further comprises a third interface display frame which is displayed with the first and second interface display frames, but that is distinguished from the first and second interface display frames on the display screen, and which displays a network profile of the contact.

3. A user interface as recited in claim 2, wherein the user interface further comprises a fourth interface display frame which is displayed with the first, second and third interface display frames, but that is distinguished from the first, second and third interface display frames on the display screen, and which displays an organization profile of the contact.

4. A user interface as recited in claim 1, wherein the user interface further comprises a third interface display frame which is displayed with the first and second interface display frames, but that is distinguished from the first and second interface display frames on the display screen, and which displays an organization profile of the contact.

5. A user interface as recited in claim 1, wherein the first interface display frame further displays information corresponding to a current status of the contact.

6. A user interface as recited in claim 1, wherein at least one of the first second interface display frames comprises a visible frame border.

7. A user interface as recited in claim 1, wherein the communications history page includes a listing of communications sent to the contact by the user, as well as communications received by the user from the contact.

8. A user interface as recited in claim 1, wherein the user interface further displays an additional link which is selectable and that is directly linked to files associated with the contact.

9. A user interface as recited in claim 1, wherein the user interface further includes a plurality of selectable links for launching communications with the contact through a plurality of corresponding communication means.

10. A user interface comprising:
a display that is operably connected to a computing system that includes a processor and memory and which includes the following:
a contact information display frame which displays contact information that identifies a contact and that can be used to initiate communication with the contact;
a communication history display frame which is displayed with the contact information display frame, but that is distinguished from the contact information display frame on the display screen, and which displays a communication history corresponding to the contact, wherein the communication history includes both communications sent from a user to the contact as well as communications received by the user that were sent from the contact; and
a selectable link which, when selected, changes an amount of contact information displayed in the contact information display frame.

11. A user interface as recited in claim 10, wherein the contact information includes status information corresponding to a current status of the contact.

12. A user interface as recited in claim 10, wherein the communication history display frame includes two separate display frames, wherein a first of the two separate display frames displays communications sent to the contact and wherein a second of the two separate display frames displays communications sent by the contact.

13. A user interface as recited in claim 10, wherein each of the two separate display frames are independently scrollable.

14. A user interface as recited in claim 10, wherein the communication history display frame includes at least two separate display frames, wherein each of the at least two separate display frames displays communications corresponding to a different day.

15. A user interface as recited in claim 14, wherein at least one of the at least two separate display frames displays a plurality of communications.

16. A user interface as recited in claim 15, wherein the plurality of communications include at least two different types of communications, the at least two different types of communications including at least two types selected from the group comprising: an email communication type, an instant message communication type and a phone communication type.

17. A user interface as recited in claim 10, wherein the user interface further includes a link for selectably sorting the communications displayed in the communications history display frame by communication type, the communication type including at least one of an email communication type, a phone communication type and an instant message communication type.

18. A user interface as recited in claim 10, wherein the user interface further includes a plurality of interactive filter objects for selectably filtering the communications displayed in the communications history display frame to either communications sent to the contact or communications sent by the contact or to communications corresponding to one or more keywords.

19. A user interface comprising:
a display that is operably connected to a computing system that includes a processor and memory and which includes the following:
a first interface display frame which displays a condensed form of contact information that identifies a contact and that can be used to initiate communication with the contact;
a second interface display frame which is displayed with the first interface display frame, but that is distinguished from the first interface display frame on the display screen, and which displays general contact information corresponding to the contact;
an interface display object comprising a selectable link which is displayed with the first and second interface display frames and that directly links to a communications history page which displays a communication history between a user and the contact;
a third interface display frame which is displayed with the first and second interface display frames, but that is distinguished from the first and second interface display frames on the display screen, and which displays a network profile of the contact; and
a fourth interface display frame which is displayed with the first, second and third interface display frames, but that is distinguished from the first, second and third interface display frames on the display screen, and which displays an organization profile of the contact.

20. A user interface comprising:
a display that is operably connected to a computing system that includes a processor and memory and which includes the following:
a contact information display frame which displays contact information that identifies a contact and that can be used to initiate communication with the contact; and
a communication history display frame which is displayed with the contact information display frame, but that is distinguished from the contact information display frame on the display screen, and which displays a communication history corresponding to the contact, wherein the communication history includes both communications sent from a user to the contact as well as communications received by the user that were sent from the contact, wherein the communication history display frame includes two separate display frames, wherein a first of the two separate display frames displays communications sent to the contact and wherein a second of the two separate display frames displays communications sent by the contact.

21. A user interface comprising:

a display that is operably connected to a computing system that includes a processor and memory and which includes the following:

- a contact information display frame which displays contact information that identifies a contact and that can be used to initiate communication with the contact;
- a communication history display frame which is displayed with the contact information display frame, but that is distinguished from the contact information display frame on the display screen, and which displays a communication history corresponding to the contact, wherein the communication history includes both communications sent from a user to the contact as well as communications received by the user that were sent from the contact,
- wherein the plurality of communications include at least two different types of communications, the at least two different types of communications including at least two types selected from the group comprising: an email communication type, an instant message communication type and a phone communication type.

22. A user interface comprising:

a display that is operably connected to a computing system that includes a processor and memory and which includes the following:

- a contact information display frame which displays contact information that identifies a contact and that can be used to initiate communication with the contact;
- a communication history display frame which is displayed with the contact information display frame, but that is distinguished from the contact information display frame on the display screen, and which displays a communication history corresponding to the contact, wherein the communication history includes both communications sent from a user to the contact as well as communications received by the user that were sent from the contact; and
- a link for selectably sorting the communications displayed in the communications history display frame by communication type, the communication type including at least one of an email communication type, a phone communication type and an instant message communication type.

23. A user interface comprising:

a display that is operably connected to a computing system that includes a processor and memory and which includes the following:

- a contact information display frame which displays contact information that identifies a contact and that can be used to initiate communication with the contact;
- a communication history display frame which is displayed with the contact information display frame, but that is distinguished from the contact information display frame on the display screen, and which displays a communication history corresponding to the contact, wherein the communication history includes both communications sent from a user to the contact as well as communications received by the user that were sent from the contact; and
- a plurality of interactive filter objects for selectably filtering the communications displayed in the communications history display frame to either communications sent to the contact or communications sent by the contact or to communications corresponding to one or more keywords.

* * * * *